US007584890B2

(12) United States Patent
Mazowiesky et al.

(10) Patent No.: US 7,584,890 B2
(45) Date of Patent: Sep. 8, 2009

(54) VALIDATOR LINEAR ARRAY

(75) Inventors: Thomas Mazowiesky, Patchogue, NY (US); Harold Charych, Poquott, NY (US); Mirek Blaszczec, Lindenhurst, NY (US)

(73) Assignee: Global Payment Technologies, Inc., Hauppauge, NY (US)

( * ) Notice: Subject to any disclaimer, the term of this patent is extended or adjusted under 35 U.S.C. 154(b) by 0 days.

(21) Appl. No.: 11/473,368

(22) Filed: Jun. 23, 2006

(65) Prior Publication Data

US 2007/0295812 A1 Dec. 27, 2007

(51) Int. Cl.
*G06K 7/10* (2006.01)

(52) U.S. Cl. .................. 235/454; 235/375; 235/462.01; 194/207; 356/71

(58) Field of Classification Search ................. 235/454, 235/462.01, 375; 194/207; 356/71
See application file for complete search history.

(56) References Cited

U.S. PATENT DOCUMENTS 3,937,926 A 2/1976 Jones et al.
4,091,271 A 5/1978 Jones et al.
4,587,434 A 5/1986 Roes et al.
4,634,850 A * 1/1987 Pierce et al. ........... 235/462.41
4,786,792 A * 11/1988 Pierce et al. ................ 235/454
5,209,395 A 5/1993 Zouzoulas et al.
5,220,665 A 6/1993 Coyle et al.
5,257,121 A * 10/1993 Steinberg .................... 358/447
5,265,008 A 11/1993 Benton et al.
5,420,406 A * 5/1995 Izawa et al. ................. 235/454
5,548,110 A 8/1996 Storch et al.
5,553,859 A 9/1996 Kelly et al.
5,617,528 A 4/1997 Stechmann et al.
5,625,663 A 4/1997 Swerdloff et al.
5,649,185 A 7/1997 Antognini et al.
5,730,271 A 3/1998 Buchman et al.
5,781,654 A 7/1998 Carney
5,836,435 A 11/1998 Fujita et al.

(Continued)

FOREIGN PATENT DOCUMENTS

EP 1 049 055 A2 11/2000

(Continued)

OTHER PUBLICATIONS

"Digital Image Processing"; Wikipedia, the free encycolpedia; http://en.wikipedia.org/wiki/Digital_image_processing: Feb. 3, 2006; 2 pages.

(Continued)

*Primary Examiner*—Thien M. Le
*Assistant Examiner*—Christle I Marshall
(74) *Attorney, Agent, or Firm*—Finnegan, Henderson, Farabow, Garrett & Dunner, L.L.P.

(57) ABSTRACT

An embodiment of the invention may include an apparatus. The apparatus may include a channel configured to accommodate a note, a photodetector array preferably arranged substantially perpendicular to a direction of travel of the note through the channel, a transporter configured to transport the note through the channel, at least one illuminator configured to illuminate a width of the channel, and a lens associated with the photodetector array. The lens and the at least one illuminator may be arranged to provide optical data collected from the width of the channel to the photodetector array. The photodetector array may include a plurality of photodetectors.

49 Claims, 6 Drawing Sheets

U.S. PATENT DOCUMENTS

| | | | |
|---|---|---|---|
| 5,890,141 A | 3/1999 | Carney et al. | |
| 5,923,413 A * | 7/1999 | Laskowski | 356/71 |
| 5,974,150 A | 10/1999 | Kaish et al. | |
| 6,026,250 A * | 2/2000 | Goto et al. | 396/210 |
| 6,044,952 A * | 4/2000 | Haggerty et al. | 250/556 |
| 6,062,481 A | 5/2000 | Storch et al. | |
| 6,076,826 A | 6/2000 | Gerlier et al. | |
| 6,155,491 A | 12/2000 | Dueker et al. | |
| 6,181,814 B1 | 1/2001 | Carney | |
| 6,225,641 B1 * | 5/2001 | Stoner et al. | 250/568 |
| 6,233,340 B1 | 5/2001 | Sandru | |
| 6,265,706 B1 * | 7/2001 | Oliver et al. | 250/208.1 |
| 6,304,660 B1 | 10/2001 | Ehrhart et al. | |
| 6,371,473 B1 | 4/2002 | Saltsov et al. | |
| 6,405,929 B1 | 6/2002 | Ehrhart et al. | |
| 6,419,157 B1 | 7/2002 | Ehrhart et al. | |
| 6,450,403 B1 | 9/2002 | Martens et al. | |
| 6,457,640 B2 | 10/2002 | Ramachandran et al. | |
| 6,466,830 B1 | 10/2002 | Manross et al. | |
| 6,486,464 B1 * | 11/2002 | Ma et al. | 250/223 R |
| 6,549,624 B1 | 4/2003 | Sandru | |
| 6,598,788 B1 | 7/2003 | Dabrowski | |
| 6,603,872 B2 | 8/2003 | Jones et al. | |
| 6,644,773 B2 | 11/2003 | Bildstein et al. | |
| 6,678,402 B2 | 1/2004 | Jones et al. | |
| 6,714,288 B2 | 3/2004 | Cohen | |
| 6,724,926 B2 | 4/2004 | Jones et al. | |
| 6,724,927 B2 | 4/2004 | Jones et al. | |
| 6,744,050 B1 | 6/2004 | Hornung et al. | |
| 6,757,700 B1 | 6/2004 | Druck | |
| 6,766,045 B2 * | 7/2004 | Slepyan et al. | 382/135 |
| 6,774,986 B2 * | 8/2004 | Laskowski | 356/71 |
| 6,792,110 B2 | 9/2004 | Sandru | |
| 6,802,006 B1 | 10/2004 | Bodrov | |
| 6,848,561 B2 | 2/2005 | Bao | |
| 6,868,187 B2 | 3/2005 | Ito | |
| 6,874,682 B2 | 4/2005 | Utz et al. | |
| 6,901,862 B2 | 6/2005 | Yamaguchi et al. | |
| 6,933,507 B2 | 8/2005 | Purser et al. | |
| 6,959,859 B2 | 11/2005 | Saltsov et al. | |
| 6,966,712 B2 | 11/2005 | Trelewicz et al. | |
| 6,981,637 B2 | 1/2006 | Nagayoshi et al. | |
| 6,981,648 B1 * | 1/2006 | Inaba et al. | 235/462.14 |
| 7,271,398 B2 * | 9/2007 | Androsyuk et al. | 250/461.1 |
| 2001/0015311 A1 | 8/2001 | Mennie | |
| 2003/0081197 A1 * | 5/2003 | Zoladz et al. | 356/71 |
| 2003/0202690 A1 | 10/2003 | Jones et al. | |
| 2004/0028266 A1 | 2/2004 | Jones et al. | |
| 2004/0125358 A1 | 7/2004 | Numata | |
| 2005/0047642 A1 | 3/2005 | Jones et al. | |
| 2005/0117791 A2 | 6/2005 | Raterman et al. | |
| 2005/0117792 A2 | 6/2005 | Graves et al. | |
| 2005/0163361 A1 | 7/2005 | Jones et al. | |
| 2005/0163362 A1 | 7/2005 | Jones et al. | |
| 2005/0169511 A1 | 8/2005 | Jones | |
| 2005/0183928 A1 | 8/2005 | Jones et al. | |
| 2005/0276458 A1 | 12/2005 | Jones et al. | |
| 2005/0278239 A1 | 12/2005 | Jones et al. | |

FOREIGN PATENT DOCUMENTS

| | | |
|---|---|---|
| EP | 1 248 224 A2 | 10/2002 |
| GB | 2 366 371 A | 3/2002 |

OTHER PUBLICATIONS

"Algorithm"; Wikipedia, the free encycolpedia; http://en.wikipedia.org/wiki/Algorithm; Feb. 3, 2006; 7 pages.
"Image Processing"; Wikipedia, the free encycolpedia; http://en.wikipedia.org/wiki/Image_processing; Feb. 3, 2006; 4 pages.
"Digital image"; Wikipedia, the free encycolpedia; http://en;wikipedia.org/wiki/Digital_image; Feb. 3, 2006; 2 pages.
"Image Scanner"; Wikipedia, the free encycolpedia; http://en.wikipedia.org/wiki/Image_scanner; Feb. 3, 2006; 3 pages.
"Edge Detection Methods"; http://www.owlnet.rice.edu/~elec539/Projects97/segment/edge.html; Feb. 3, 2006; 4 pages.
"First Maine casino selects JCM bill acceptor"; http://www.selfserviceworld.com/article_printable.php?id=3931&page=38; Feb. 3, 2006; 2 pages.
International Search Report dated Feb. 5, 2008, 11 pages.

* cited by examiner

VALIDATOR LINEAR ARRAY

BACKGROUND

This description will use the term "note" as a descriptor for currency, banknotes, barcode coupons and other documents that may be electronically scanned for recognition and validation.

There are numerous systems used in the note validation field. Several manufacturers have developed note validators that use similar basic validation techniques. These devices typically use optical methods and means to determine the type and authenticity of a note.

Usually, light from an LED is transmitted through, and in some devices, reflected from the note in question. A transport moves the note past individual photo detectors arranged perpendicular to the direction of travel of the note. The individual photodetectors detect the transmitted and reflected light from the note, and convert that light into electrical signals that a microprocessor samples and stores. The pattern of detected signals is then compared through an algorithm to representations of authentic notes stored, for example, in a database. Through these algorithms, a decision is made regarding the type and authenticity of the inserted note. Once validated, the note is typically transported to a secure storage box or stacker, integrated with the validator.

In the United States, notes of varying denominations are cut to the same width, 68 mm. Many other countries designs use notes of varying width, usually increasing the width of a note with increasing denomination. As an example, the European Union utilizes notes with widths ranging from 62 mm for the five Euro note to 85 mm for the five hundred Euro note. Thus, a validator must accommodate the range of widths of the inserted notes. This complicates the recognition process, as the smaller notes, if inserted in a wide channel, will be inconsistently positioned with respect to the sensors used to recognize and verify the notes.

Validators typically use between five and eight individual photodetector sensors for note recognition. This means that a small note in a wide channel will actually produce several different possible signals for collection by the validator depending on its position on entry into the validator. Since the smaller notes do not cover the entire channel, one or more sensors will be partially or completely uncovered, rendering data from this sensor(s) of little or no use in validation. The potential multiple variations of signals that can be generated by the same note are stored internally, using up valuable memory space, increasing the cost of a practical validator and/or reducing the number of different denominations that can be recognized. A note may also be inserted at an angle to the sensors, causing a skewed representation of the note to be scanned, and further potential signal variations on a note.

One method of addressing this problem is to use a mechanical device to automatically straighten and center the note before the validator passes it over the sensors. As an example, UNIVERAL BILL ACCEPTOR (UBA) manufactured by JAPAN CASH MACHINE, CO., LTD. uses this method in one of their products. When a note is inserted into the validator, it is drawn into a pre-scan area by drive wheels. A mechanical centering mechanism is then activated to center the note in the channel. When the note is centered, the bill transport starts transporting the note past the validation sensors. Bill centering channels act as guides to keep the note moving straight and aligned with the sensor system.

This method may have the advantage of aligning the note to the sensor system with repeatability for each insertion, ensuring that the sensors reliably read the same area of the note for each insertion of a particular denomination. Accordingly, this may reduce the amount of data needed for the stored representations of a particular valid note.

The drawbacks to this method are the time required to physically center the note, the additional parts for the mechanical centering system and the room required in the validator for the centering mechanism. It also may take additional time for such mechanism to physically center the note. The additional parts for centering the note add cost and complexity to an already complex mechanism for validating currency. Space for a validator in the typical vending machine or slot game is usually quite limited and the additional centering mechanism adds volume or uses space that might be used for additional validation sensors.

In another type of validation unit, for example, a VECTOR model manufactured by Valtech, Inc., the user must align the note to one edge of the validator to activate the unit. While this can promote correct positioning of the note, it requires the user to be informed of this method by signage, pictures or text before using the validator. Also, a note with a torn corner may not be accepted by a unit of this type if the missing corner is located where the edge detection sensor is located.

SUMMARY

Systems, methods and apparatus are provided for validating notes. According to one exemplary embodiment, a validation device is provided which substantially eliminates the need to physically align the currency before or during insertion into the validation device while retaining the ability to use the minimum amount of stored information to recognize and validate the note as if it were aligned to the sensor system.

According to another exemplary embodiment, an apparatus is provided that may include a channel configured to accommodate a note, a photodetector array, a transporter configured to transport the note through the channel, at least one illuminator configured to illuminate a width of the channel, and a lens associated with the photodetector array. A combination of the lens and the at least one illuminator may be arranged to provide optical data collected from the width of the channel to the photodetector array.

In various embodiments, the invention may include one or more of the following aspects: the photodetector array may be arranged substantially perpendicular to a direction of travel of the note through the channel; the photodetector array may be an integrated circuit array; the at least one illuminator may be an LED; a wavelength of the at least one illuminator may be in the ultraviolet spectrum; a wavelength of the at least one illuminator may be in the infrared, visible, or blue spectrum; a combination of the lens and the photodetector array may be configured to obtain the optical data by receiving light emitted from the at least one illuminator and reflected from the note; a combination of the lens and the photodetector array may be configured to obtain the optical data by receiving light emitted from the at least one illuminator and transmitted through the note; the at least one illuminator may be configured to emit light having more than one wavelength; the at least one illuminator may be configured to project a line of light substantially perpendicular to the direction of travel of the note through the channel; the note may be a bar coupon; the line of light may have a width substantially equal to or less than a width of the widest bar on the bar coupon; a combination of the lens and the photodetector array may be configured to obtain the optical data by receiving the line of light emitted from the at least one illuminator and reflected by the bar coupon; a central processing unit configured to receive the optical data from the photodetector array, the central processing unit may be configured to average the optical data in a direction across the photodetector array so as to reduce a resolution of the optical data; the central processing unit may be configured to average the optical data in the direction of travel of the note through the channel so as to reduce a resolution of the optical data; the central processing unit may be configured to center the note in the channel; and the apparatus may be a currency validator and the note may be a currency note.

According to a further exemplary embodiment, an apparatus may be provided and may include a channel configured to accommodate a note, a transporter configured to transport the note through the channel, a first photodetector array, the first photodetector array being disposed on a first side of the channel, a first lens associated with the first photodetector array, a second photodetector array, the second photodetector array being disposed on a second side of the channel, a second lens associated with the second photodetector array, and at least one illuminator configured to illuminate a width of the channel. The first lens may be arranged to provide optical data to the first photodetector array collected from the width of the channel illuminated by the at least one illuminator. The second lens may be arranged to provide optical data to the second photodetector array collected from the width of the channel illuminated by the at least one illuminator.

In various embodiments, the invention may include one or more of the following aspects: the first and second photodetector arrays may be arranged substantially perpendicular to a direction of travel of the note through the channel; the first and second photodetector arrays may be disposed on substantially opposite sides of the channel; at least one of the first and second photodetector arrays may be an integrated circuit array; the at least one illuminator may be an LED; a wavelength of the at least one illuminator may be in the ultraviolet spectrum; a wavelength of the at least one illuminator may be in the infrared, visible, or blue spectrum; a combination of the first lens and the first photodetector array may be configured to obtain the optical data by receiving light emitted from the at least one illuminator and reflected from the note; a combination of the second lens and the second photodetector array may be configured to obtain the optical data by receiving light emitted from the at least one illuminator and transmitted through the note; the at least one illuminator may be configured to emit light having more than one wavelength; the at least one illuminator may be configured to project a line of light substantially perpendicular to the direction of travel of the note through the channel; the note may be a bar coupon; the line of light may have a width substantially equal to or less than a width of the widest bar on the bar coupon; a combination of the first lens and the first photodetector array may be configured to obtain the optical data by receiving the line of light emitted from the at least one illuminator and reflected by the bar coupon; a central processing unit configured to receive the optical data from at least one of the first and second photodetector arrays; the central processing unit may be configured to average the optical data in a direction across the photodetector array so as to reduce a resolution of the optical data; the central processing unit may be configured to average the optical data in the direction of travel of the note through the channel so as to reduce a resolution of the optical data; the central processing unit may be further configured to average the optical data in the direction of travel of the note through the channel so as to further reduce the resolution of the optical data; the central processing unit may be configured to center an image of the note associated with the optical data; and the apparatus may be a currency validator and the note may be a currency note.

According to yet another exemplary embodiment, an apparatus may be provided and may include a channel configured to accommodate a note, a transporter configured to transport the note through the channel, a photodetector array, a lens associated with the photodetector array, at least one first illuminator configured to illuminate the note in the channel, the at least one first illuminator being disposed on a same side of the channel as the photodetector array, and at least one second illuminator configured to illuminate the note in the channel. The at least one second illuminator may be arranged such that light travels from the at least one second illuminator, through the note, through the lens, and to the photodetector array.

In various embodiments, the invention may include one or more of the following aspects: the at least one second illuminator may be disposed on a side of the channel opposite the photodetector array; the lens and the photodetector array may be configured to receive reflected light from the at least one first illuminator and transmissive light from the at least one second illuminator; the photodetector array may be arranged substantially perpendicular to a direction of travel of the note through the channel; the photodetector array may be an integrated circuit array; at least one of the at least one first illuminator and the at least one second illuminator may be an LED; a wavelength of at least one of the at least one first illuminator and the at least one second illuminator may be in the ultraviolet spectrum; a wavelength of at least one of the at least one first illuminator and the at least one second illuminator may be in the infrared, visible, or blue spectrum; the at least one first illuminator may emit light having a first wavelength and the at least one second illuminator may emit light having a second wavelength different from the first wavelength; at least one of the at least one first illuminator and the at least one second illuminator may be configured to emit light having more than one wavelength; at least one of the at least one first illuminator and the at least one second illuminator may be configured to project a line of light substantially perpendicular to the direction of travel of the note through the channel; the note may be a bar coupon; the line of light may have a width substantially equal to or less than a width of the widest bar on the bar coupon; a combination of the lens and the photodetector array may be configured to obtain optical data by receiving the line of light emitted from the at least one first illuminator and reflected by the bar coupon; a combination of the lens and at least one of the at least one first illuminator and the at least one second illuminator may be arranged to provide optical data collected from the width of the channel to the photodetector array; a central processing unit configured to receive the optical data from the photodetector array; the central processing unit may be configured to average the optical data in a direction across the photodetector array so as to reduce a resolution of the optical data; the central processing unit may be configured to average the optical data in the direction of travel of the note through the channel so as to reduce a resolution of the optical data; the central processing unit may be configured to center the note in the channel; and the apparatus may be a currency validator and the note may be a currency note.

It is to be understood that both the foregoing general description, objects, and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

DETAILED DESCRIPTION

Reference will now be made in detail to exemplary embodiments of the invention, examples of which are illustrated in the accompanying drawings. Wherever possible, the same reference numbers will be used throughout the drawings to refer to the same or like parts.

Figure 1:
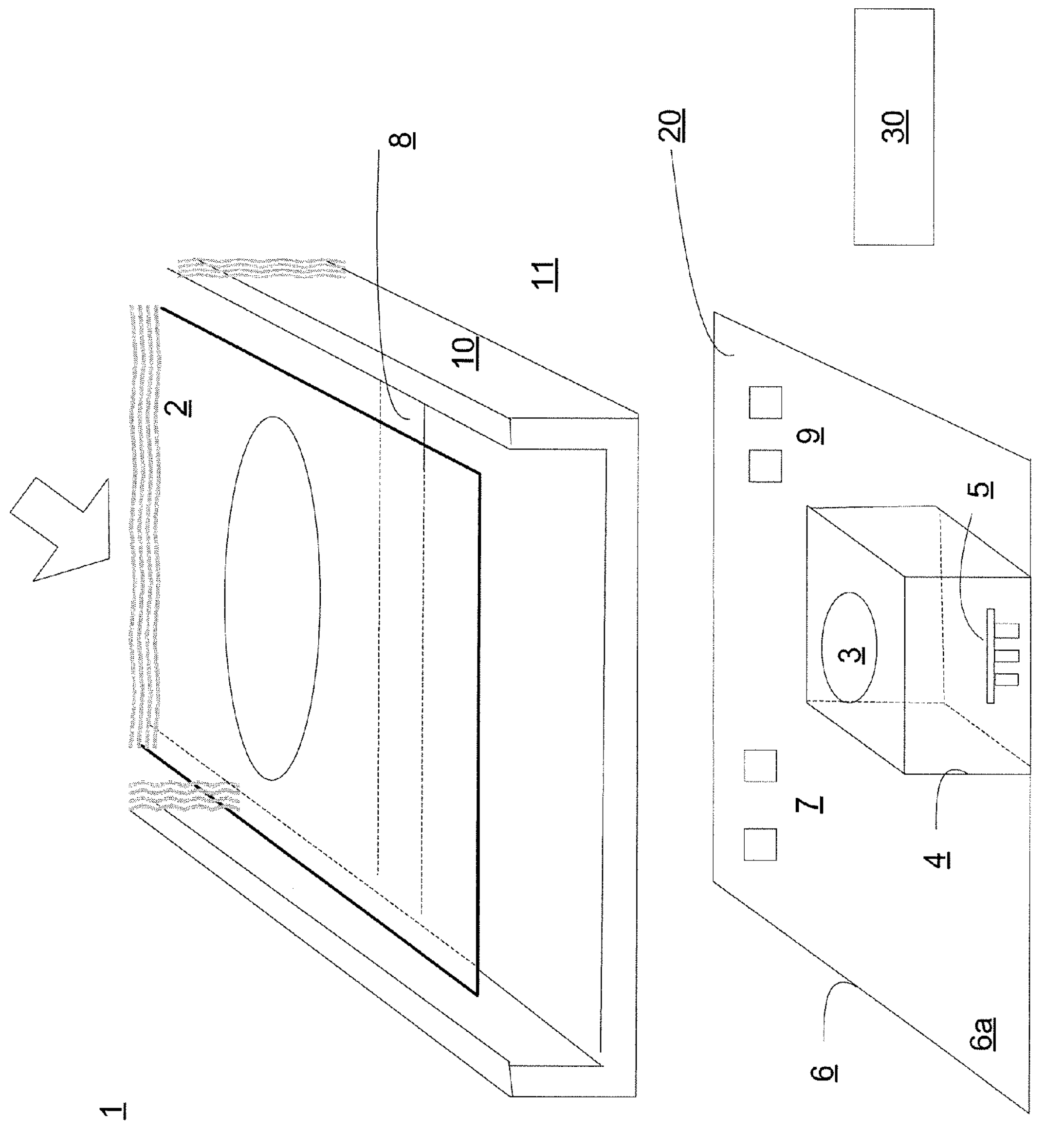
FIG. 1 is a system for validating notes, according to one illustrative embodiment of the invention.
Figure 2:
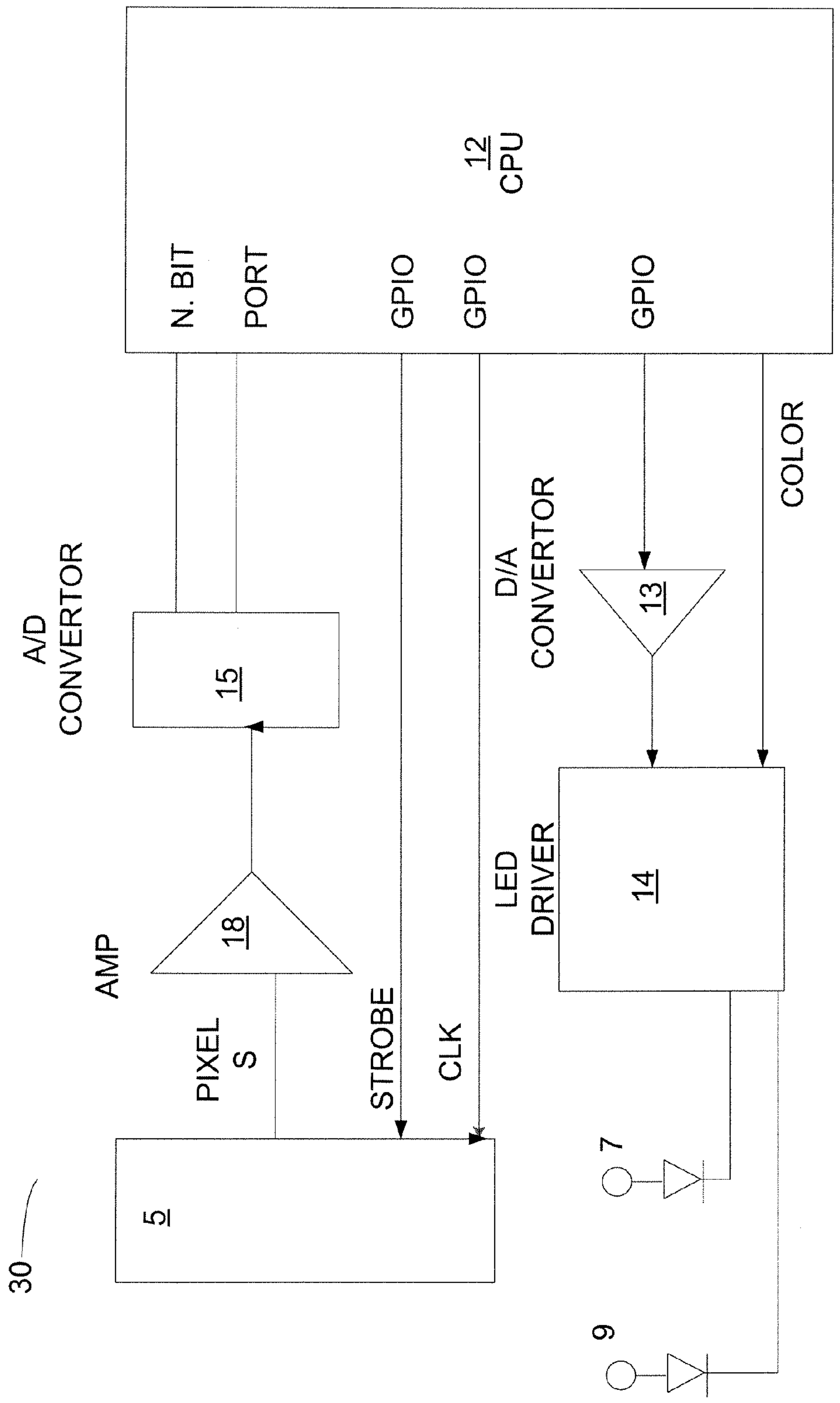
FIG. 2 is a block diagram of the electronic components used in the system of FIG. 1 to sample the optical data.

FIGS. 1-2 show an exemplary embodiment of a system and components thereof for validating a note. Referring to FIG. 1, system 1 may include one or more of a note transporter 10, a note scanning module 20, and a processing module 30. Each component will be described in turn.

Note transporter 10 may be any suitable note transporter. Note transporter 10 may be configured to transport note 2 through note channel 11 in any suitable direction using any suitable means, for example, by rollers or belts in a direction denoted by the arrow in FIG. 1. Note channel 11 may be at least as wide as the largest currency note in circulation, however, note channel 11 may have any suitable dimensions in the length, width, and height directions. Note transporter 10 may be constructed of an opaque material such as black ABS plastic. However, note transporter 10, or portions of note transporter 10, may also or alternatively be made of a transparent material. For example, note transporter 10 may include transmission window 8, which may be disposed between note 2, and lens 3 and/or linear array 5. Note 2 may be transported through note transporter 10 at a rate such that a specific number of lines of note 2 may be scanned (e.g., one line for each wavelength may be scanned every 0.6 mm of note 2). The rate may be incremental or substantially continuous.

A note scanning module 20 on which other components may be placed may include a printed circuit board 6. A main surface 6*a* of printed circuit board 6 may be mounted substantially parallel with a bottom surface of note transporter 10 and/or a plane including note 2 as it travels through note channel 11, however, any suitable configuration that allows scanning of note 2 will suffice. Printed circuit board 6 may include any number of components necessary to scan note 2, for example, one or more of lens 3, lens mount/light shield 4, linear array 5, and LEDs 7, 9.

Lens 3 may be mounted to lens mount 4, which may in turn itself be mounted to printed circuit board 6. Lens 3 may be disposed between linear array 5 and note channel 11 and/or note 2. Lens 3 may be mounted such that an entire width of note channel 11 is viewable by linear array 5, for example, via transmission window 8. The distances between lens 3, linear array 5, and note 2 may be jointly or independently set and controlled by any suitable mechanism and/or method. Lens 3 may be configured such that an entire width of note channel 11 is focused on linear array 5, even if linear array 5 has a width that is less than a width of note channel 11.

Linear array 5 may be any suitable note scanning array. Quite simply, a linear array is a row of sensors configured to take a simultaneous scan of a line of an object, e.g., an entire width of a note 2. This is in contrast to individual photodetectors used in conventional validators, which are only configured to scan and collect data relative to one point of note 2. Even a plurality of individual photodetectors can only scan a plurality of points, and not an entire line of data.

An acceptable linear array 5 includes a TSL1401R, 128×1 array manufactured by TAOS INC. The TSL1401R is well adapted for use in note scanning. Some generally desirable features of a linear array 5 which the TSL1301R possesses includes a good response to a wide frequency range (e.g., between about 350 and about 980 nm), a suitably wide dynamic range (e.g., about 72 dB), a linear response across the array (e.g., <4%), a pixel readout frequency of about 8 MHz, and a sufficient number of pixels across the array (e.g., 128) to give sub-millimeter resolution without generating excessive data. Each pixel on the array may be specified to be within about ±7.5% of the average of all pixels in the array, over temperature. Linear array 5 may be configured to scan a note 2 having a width of about 8 mm (i.e., about a width of linear array 5 itself) up to at least a note 2 having a width of about 90 mm (i.e., suitably width enough to accommodate substantially all paper currencies). Each pixel may scan a line of note 2 having a width in a direction of travel of note 2 of about 0.67 mm. Accordingly, linear array 5 may scan a line of note 2 about every 0.6 mm per wavelength. The device is physically small, inexpensive and is well adapted to use with commercially available lenses, thereby reducing overall costs for use in a note validator. The device can be used over a wide voltage range, making it suitable for use, for example, with both 5 volt and 3.3 volt based systems.

System 1 and/or note scanning module 20 may include one or more illuminators or sets of illuminators such as LEDs 7, 9 used to illuminate transmission window 8. One set of LEDs 7 may be configured to emit light having a frequency different from a second set of LEDs 9. LEDs 7, 9 may also or alternatively be connected and controlled such that only set of LEDs which emit light at one frequency may be illuminated at any point in time. As an example, LEDs 7 may be 660 nm red LEDs, and LEDs 9 may be 880 nm infrared LEDs. At any one time, LEDs 7 and/or LEDs 9 may be illuminated. Additional colors can be added and/or selected by adding more LEDs and/or control signals, for example, blue (470 nm) or green (565 nm). However, LEDs 7, 9 may emit any color, for example, red, infrared, ultraviolet, or any other wavelength in the visible or non-visible spectrum Processing module 30, as schematically set forth in portions of FIG. 2, may include one or more of amplifier 18, A/D converter 11, CPU 12, D/A converter 13, and LED driver circuitry 14. Processing module 30 may control one or more of LEDs 7, 9 and linear array 5.

A combination of CPU 12, D/A converter 13, and LED driver 14 may control LEDs 7, 9. For example, CPU 12 may be used to set the intensity and/or duration of light output from LEDs 7, 9. A digital signal indicating such may thus be sent from CPU 12 to D/A converter 13, which may convert the digital signal into an analog signal, and then that signal may be sent to LED driver 14, which in turn will control the intensity and duration of light out from LEDs 7, 9 at the predetermined levels. In another example, CPU 12 may be used to determine which set of LEDs 7, 9 are illuminated. CPU 12 may send a signal COLOR to LED driver 14 indicating that only one color set of LEDs 7, 9 are to be illuminated at a given time. LED driver 14 will thus illuminate the proper set of LEDs 7, 9. Choosing which set of LEDs 7, 9 to illuminate may be a function of several factors, for example, the color and composition of note 2 being scanned. In operation, as note 2 moves through note channel 11, LEDs 7, 9 may be illuminated on alternate exposure cycles by LED driver 14, which may result in a multi-color scan of note 2. For example, for a two color scan of note 2, a line of note 2 will be read about every 0.3 mm, alternating wavelengths of LEDs 7, 9, resulting in one scan for each wavelength every 0.6 mm. Additional colors can be added and/or selected by adding more LEDs and/or control signals, for example, blue (470 nm) or green (565 nm). No matter how many color(s) are used, however, the process of scanning may be consistent.

A combination of CPU 12, A/D converter 15, and amplifier 18 may control and/or receive data scanned from note 2 by linear array 5. Specifically, linear array 5 may be functionally connected to CPU 12 through signals STROBE and CLK. For example, in order to signal to linear array 5 to scan (e.g., capture light) note 2 and/or note channel 11, CPU 12 may set the STROBE function on high and send that signal to linear array 5. Linear array 5, being a scanner, may then turn "on" and begin to scan data reflected and/or transmitted from note 2 and/or note channel 11 from one or more of LEDs 7, 9. Once CPU 12 has determined that linear array 5 has been sufficiently exposed to note 2 and/or note channel 11, CPU 12 may set the STROBE function on low, and send the signal to linear array 5 to end scan. The timing between these STROBE signals may be used to control the amount of time linear array 5 is exposed to note 2 for each scan. Such exposure time may have been set and/or previously determined as necessary to provide sufficient light to linear array 5 from note 2 that can be converted into useful data.

For example in one illustrative embodiment using three LED colors, one exposure can be taken per 0.6 mm of length of note. This causes a slight overlap between pixels along the note so that there are no gaps between pixels. Using 3 colors, an exposure is taken in red, the note moves 0.2 mm during the exposure, then an exposure is taken in Blue, the note moves 0.2 mm during the exposure, then an exposure in IR, the note moves 0.2 mm, and the next exposure would be in Red again. More colors can be used if the exposure time is shortened such that a total time for all the colors is still less than the size of the pixel (such as 0.67 mm in the TSL1401R array) given the reduction factor used (about 10.5-11 times.). Accordingly, given a 150 mm long note 223 exposures per color (150/0.67) can occur.

Between the aforementioned setting of STROBE functions on high and low, linear array 5 may receive and convert light from note 2 and/or note channel 11 into analog data, and may hold that analog data in holding registers of linear array 5. CPU 12 may then clock CLK and send that signal to linear array 5. With each CLK signal, linear array 5 may send the data stored in holding registers to amplifier 18 as signal PIXELS. Signal PIXELS may be amplified and buffered by amplifier 18, and then sent A/D converter 15. A/D converter 15 may sample the input, convert the analog signal into a digital representation of the input, and present the digital representation of signal PIXELS to CPU 12. CPU 12 may then store PIXELS in memory for later processing. This process may be repeated until all pixels of the array have been processed.

By controlling the STROBE and CLK signals, CPU 12 and/or linear array 5 may provide the capability of clocking out the electrical signal while capturing the next exposure, e.g., line of scanned data from a width of note 2, thus providing a continuous sampling and conversion process.

System 1 shown in FIGS. 1-2 is primarily configured to scan data (e.g., light) reflected from note 2. For example, light is transmitted from one or more of LEDs 7, 9 through transmission window 8, reflected off a surface of note 2 back through transmission window 8 onto lens 3, and then focused onto linear array 5 using lens 3.

Figure 5:
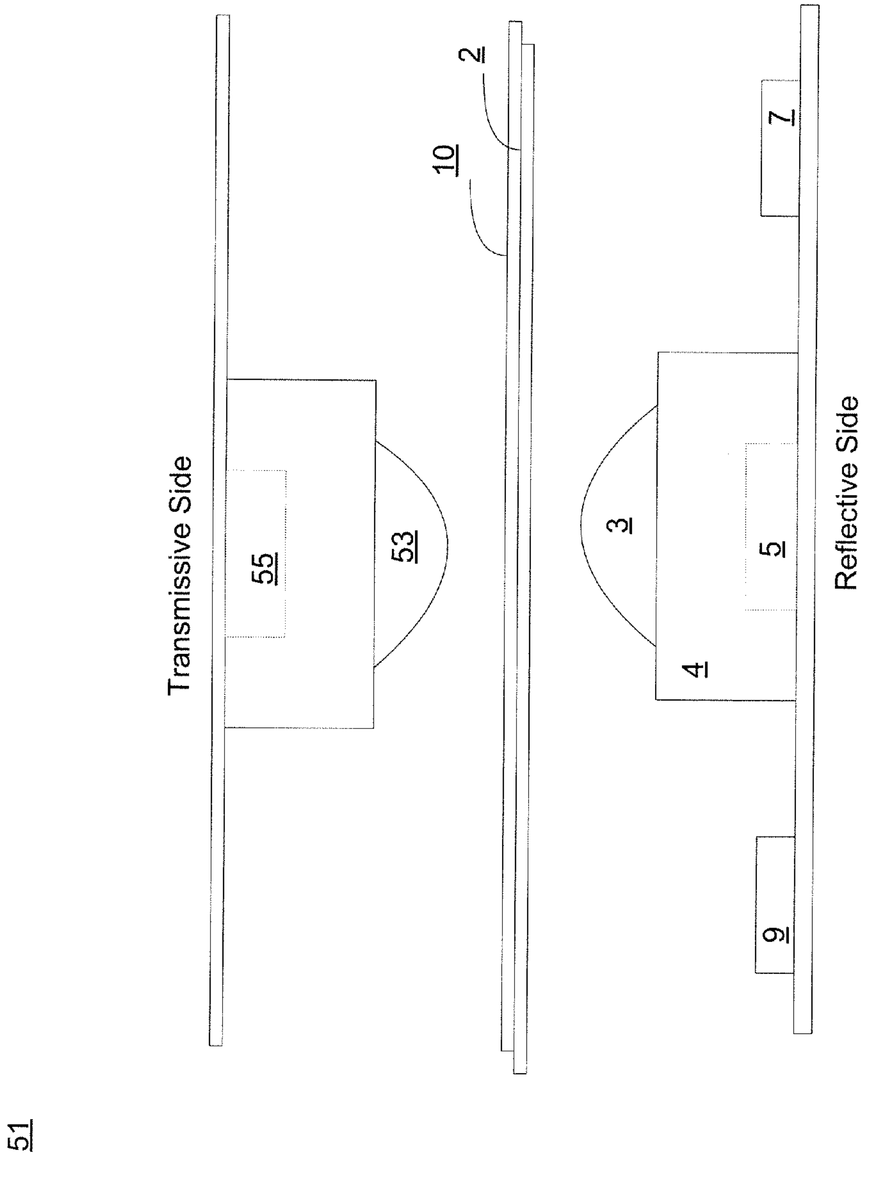
FIG. 5. is a system for validating notes including two linear arrays, according a further embodiment of the invention.

However, a system 51 may also or alternatively be configured to scan data (e.g., light) that is transmitted or passes through note 2. For example, as shown in FIG. 5, a second linear array 55 may be placed on a side of note transporter 10 opposite linear array 5. Second linear array 55 may receive light that passes through note 2 from LEDs 7, 9. Thus, CPU 12 may receive reflected data from linear array 5, and transmissive data from second linear array 55. It may be necessary to acquire transmissive data from note 2, for example, to read watermarks on note 2.

Figure 6:
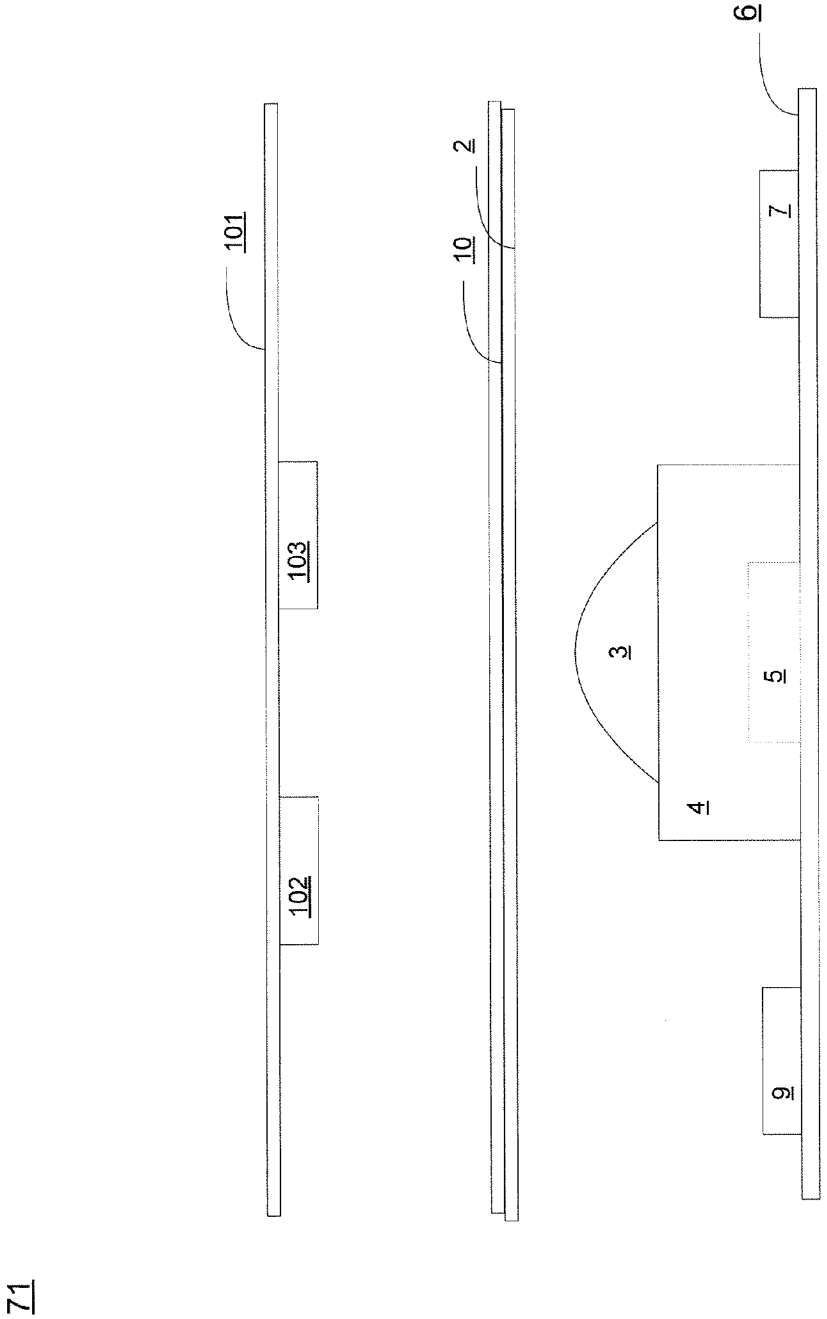
FIG. 6 is a system for validating notes including two sets of light-emitting diodes (LEDs), according to yet another embodiment of the invention.

Alternatively, a second set of independent LEDs (e.g., transmissive LEDs 102, 103 mounted on frame 101), mounted on a side of note transporter 10 substantially opposite to linear array 5 and the first set of LEDs 7, 9, may be used to illuminate note 2, for example, as shown in system 71 in FIG. 6. The light passing through note 2 from this second set of LEDs 102, 103 may be scanned by linear array 5 in substantially the same way that reflected light is scanned using the first set of LEDs (e.g., reflective LEDs 7, 9) mounted on the same side of note transporter 10 as linear arrays. The second set of LEDs 102, 103 may be illuminated when the first set of LEDs 7, 9 are turned off, and the first set of LEDs 7, 9 may be turned on while the second set of LEDs 102, 103 are turned off. This may be advantageous, as the cost for LEDs 102, 103 in system 71 in FIG. 6 may be less than the cost for linear array 55 and lens 53 in system 51 of FIG. 5.

Once the scanned data from the note 2, via linear array 5 and other components, has been transmitted to CPU 12, CPU 12 may process the data. For example, CPU 12 may process one or more stored representations of note 2 using an algorithm designed to detect the edge of the note. The edge detection algorithm may be designed to determine how wide the object scanned was and at what angle it entered note channel 11. In cases where note 2 fills note channel 11, CPU 12 may proceed directly to processing data for recognition and security. When note 2 does not fill note channel 11, CPU 12 may store the width of note 2 for later processing, then may process all the stored representations of the note through an algorithm that 'straightens' and aligns the scanned note data as if the note had been inserted perpendicular to linear array 5. This may reduce the recognition and security task to comparing the note-to-be-verified with a single database for a particular denomination, eliminating the need to physically align note prior to scanning.

Since CPU 12 may now have access to high-resolution data due the acquisition of data using system 1, the note length and width may be readily determined. In countries with multiple size notes, this may typically reduce the number of possible notes to one or two candidates, greatly reducing the amount of time required to recognize a note. The use of the high-resolution data may permit the system 1 to determine the type of note inserted with as near 100% accuracy as possible. With the type or denomination of note thus determined, the note can now be checked for its authenticity.

The data from note 2 stored in CPU 12 can also be used to electronically rotate and align the data. As an example, data from one of the transmissive or reflective planes may be processed by CPU 12 using an algorithm to emphasize the contrast of individual pixels. This 'enhanced' image can be used to determine where the edges of the note exist. This provides the length and width of the inserted note, and its orientation relative to the edges of the channel. Once the orientation of the note is determined, the data can be electronically rotated by CPU 12 using mathematical algorithms to essentially align the data as if the note were inserted into the channel along an edge of the channel. Data from all of the planes may be rotated to the same degree, producing a set of images that may be all aligned to the same angle. Since the edges of the note have been determined, and the data now rotated parallel to the insertion direction, the data has been oriented located relative to a single point, as if it had been physically aligned with the sensors. This alignment of data may permit the processing to be minimized to the same degree as if the note had been physically aligned with the sensors.

Use of sub-millimeter data may permit the CPU 12 to perform advanced algorithms and data methods. As an example, features on note 2 can be landmarked and then checked to ensure that they match that of pre-stored denominations in the database. In a further implementation, text and numerals on the note can be processed using optical character recognition techniques to quickly identify the denomination. In another example, thread location and density of a particular note 2 can be accurately determined, ensuring that an inserted note may be valid. Validators typically report rejects as unknowns, however, use of any system set forth herein may allow the type of note inserted to be reported, along with the reason for its rejection in detail. This may speed the development of a database before a release of systems 1, 51, 71, and may allow for accurate adjustment of the database for variations in real notes due to local conditions.

As shown in FIGS. 5 and 6, systems 51, 71 may include respective LEDs 7, 9, 102, 103 disposed on a side of note transporter 10 opposite from linear array 55, 5. Such a configuration may allow the scanning of high-resolution transmissive data to verify features on notes 2 not previously verifiable. For example, such systems 51, 71 could be used to more efficiently detect watermarks, which are used in many countries' currency. Watermarks may not be detectable using reflective methods because its features may not include visible surface features, and instead may only be visible through note 2. Such watermarks may also be located in various locations of each individual denomination that preclude the use of an individual photodetector to reliably read this feature, for example, the watermark may be located on a portion of note 2 which an individual photodetector may not read as each photodetector reads only a lengthwise line of note 2. The use of linear arrays 55, 5 in systems 51, 71, respectively, covers the entire width of note 2 and may allow the feature to be reliably detected and validated. This is because the watermark must be located on some portion of an entire width of note 2, and all of note 2 is scanned with linear arrays 55, 5.

In various embodiments, system 1 may be configured to scan both transmissive and reflective data. One such embodiment is shown in FIG. 6 as system 71, wherein LEDs 7, 9, 102, 103 are disposed on both sides of note transporter 10 and/or note 2, and linear array 5 is disposed on only one side of note transporter 10 and/or note 2. Another such embodiment is shown in FIG. 5 as system 51, where linear arrays 5, 55 are disposed on both sides of note transporter 10 and/or note 2, and LEDs 7, 9 are disposed on only one side of note transporter 10 and/or note 2. A further such embodiment, not shown, may include linear array 5 and LEDs 7, 9 on both sides.

Such a configuration may be useful, for example, in preventing counterfeiters from drawing or printing features on one surface of the note, but not the other. Specifically, some counterfeiters, to save more on ink, may print the counterfeit note with only half the image on one side of the note, and half of the image on the other. Thus, while a transmissive scan would result in the full image, allowing the counterfeiter to beat the note validator, a simultaneous reflective scan would show only half the image, allowing the note validator to determine it is a fake.

In various embodiments, system 1 may be configured to scan multi-spectral images, i.e., multi-color images of note 2. In such a configuration, LEDs 7, 9 would include lights having different wavelengths, and CPU 12 may control and coordinate the output of LEDs 7, 9 and data gathering of linear array 5 to create the multi-spectral image. Depending on whether transmissive or reflective data is desired, LEDs 7, 9 and linear array 5 would be placed on appropriate sides on note transporter 10 and/or note 2.

During an exemplary operation, CPU 12 may control LEDs 7, 9 such that during one "exposure" or scan of note 2 using linear array 5, only LEDs 7 may be illuminated. Thus, during this "exposure," an image of note 2 is scanned in a first wavelength. During a subsequent "exposure" or scan of note 2 using linear array 5, only LEDs 9 may be illuminated. Thus, during this "exposure," an image of note 2 is scanned at a second wavelength different from the first wavelength. When CPU 12 combines the two data sets, the resulting image of note 2 will include data from both the first and second wavelengths, even though the data for each wavelength was gathered at a different point in time.

CPU 12 may control LEDs 7, 9 and note transporter 10 such that a full multi-spectral image of note 2 may be acquired. For example, note 2 may be inserted into note transporter 10 and a scan of a first line of note 2 may be taken by linear array 5 while note 2 is illuminated by LEDs 7 having a first wavelength. Once that is done, note 2 may be advanced by note transporter 10 about half the resolution size of a pixel (e.g., about 0.3 mm when the pixel size is about 0.67 mm) such that a scan of a second line of note 2 may be taken by linear array 5 while note 2 is illuminated LEDs 9 having a second wavelength different from the first wavelength. Once that is done, note 2 may be advanced by note transporter 10 another half the resolution size of a pixel such that a scan of a third line of note 2 may be taken by linear array 5 while note 2 is again illuminated by LEDs having the first wavelength. This process would continue until the entire note 2 has been scanned.

This process may be varied depending on a variety of factors, such as pixel size and number of wavelengths of LEDs 7, 9. For example, if the pixel size is 1.00 mm, and there are three wavelengths, each increment would be about 1.00 mm divided by 3, or about 0.33 mm. One would probably round this to about 0.3 mm so as to provide a little bit of overlap and ensure all of note 2 is scanned.

In various embodiments, system 1 may have any number of LEDs 7, 9, 102, 103 in any configuration, and each of LEDs 7, 9, 102, 103 may have any wavelength. Furthermore, any of linear arrays 5, 55 may be configured to scan data for any of these wavelengths. For example, the wavelengths may be in the visible or non-visible spectrum. In another example, the wavelengths may be any color, blue (about 470 nm), green (about 565 nm), red (about 660 nm), near infrared (e.g., between about 800 nm and 1200 nm), ultraviolet (e.g., about 190 nm and 390 nm), or any other suitable wavelength.

Each image collected by linear array 5 and processed by CPU 12 in any of the aforementioned systems 1, 51, 71 at a specific wavelength is called a plane. Once all the data has been collected, each plane created for a specific wavelength may be combined into a single plane. Portions of each plane may correspond to each other because the aggregates of the different wavelengths were physically taken at the same corresponding locations on note 2. For example, if the red image was taken where note 2 was rotated 5 degrees off vertical, all other images will also be "off" by 5 degrees off vertical. Thus, when combined, the entire multi-spectral image will be "off" by 5 degrees, making correction more efficient, as all one needs to do is rotate all of the images by 5 degrees to "straighten" the image out.

Such multi-spectral and reflective/transmissive imaging using an appropriate combination of the aforementioned features of systems 1, 51, 71 may be useful because many countries print notes with ink that may be any combination of the aforementioned features. For example, a single note 2 may include features that are highly reflective in the infrared; non-reflective in the infrared; highly opaque in the infrared; and highly transparent in the infrared. Using the aforementioned features, a system 1 could be configured to detect all of these features.

For example, certain countries print the entire numeric value of a denomination in ink that may be reflective in the visible spectrum, but may be partially or completely printed in ink that may be non-reflective in the infrared spectrum. When viewed by the eye, or by machinery in the visible spectrum the numerals may be visible; when viewed by machinery in infrared light, a portion of the numerals (or the entire value) may be rendered invisible. Counterfeits created using a PC and inkjet or laser based printers could thus possibly beat a system that was configured to detect only one spectral/transmissive/reflective combination. Moreover, may of these types of features were difficult or impossible to detect using past low resolution systems. The use of the high-resolution linear arrays 5, 55 in systems 1, 51, 71 in these manners may permit these features to be accurately detected and located on note 2, thus making it easier to detect counterfeits that are missing one or more of these features. For example, in the U.S., imaging a note in transmissive, reflected visible, and UV illumination may produce combinations of results that may be difficult to imitate.

In another example, multi-spectral imaging using an appropriate configuration of systems 1, 51, 71 may be useful such that systems 1, 51, 71 may handle a wide variety of currencies, especially if both non-visible (e.g., ultraviolet) and visible light collection configurations are used. For example, U.S. currency has an overall minimal response when exposed to ultraviolet light; yet the security threads of the individual denominations ($5 and up) emit light due to secondary emissions at different frequencies. In another example, Peruvian currency has small features, including text, that emit secondary emissions in the visible spectrum when exposed to ultraviolet light. In a further example, Canadian currency uses small, random points (flechettes) that give off a bright secondary emission when exposed to ultraviolet light. Accordingly, a system 1 that can detect both ultraviolet and visible light could more effectively gather useful data from many notes 2 having different properties. Furthermore, by gathering both non-visible light and visible light, the chances of gathering useful data from note 2 is increased.

Figure 4:
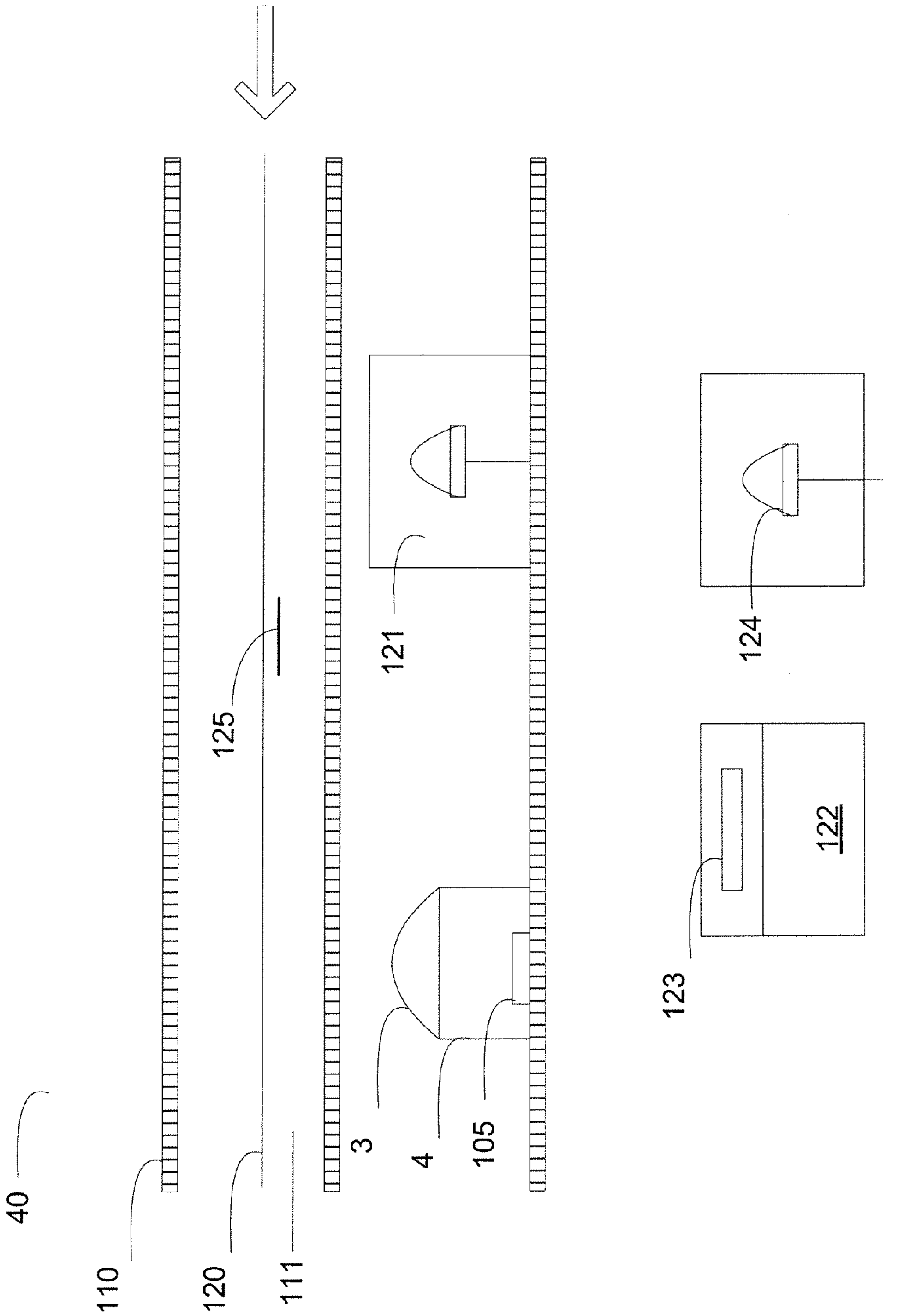
FIG. 4 is a system for validating notes having a barcode, according to another embodiment of the invention.

As shown in FIG. 4, system 40 including linear array 105 may also or alternatively be used as a detector for a barcode coupon 120. System 40 and its corresponding components may operate in a manner similar to systems 1, 51, 71.

Referring to FIG. 4, system 40 may include a thin line projector 121 including a housing 122 with a slit 123 and light source 124. Thin line projector 121 may be arranged in system 40 so as to project a line 125 on barcode coupon 120 that may be equal to or less than the thickness of an individual bar or space on barcode coupon 120 in a direction of travel of barcode coupon 120 through coupon transporter 110. The direction of travel may be denoted by the arrow in FIG. 4. Line 125 projected on barcode coupon 120 may be within the field of view of linear array 105. Thin line projector light source 124 may stay illuminated and project line 125 on barcode coupon 120 during the entire time barcode coupon 120 may be scanned.

Figure 3:
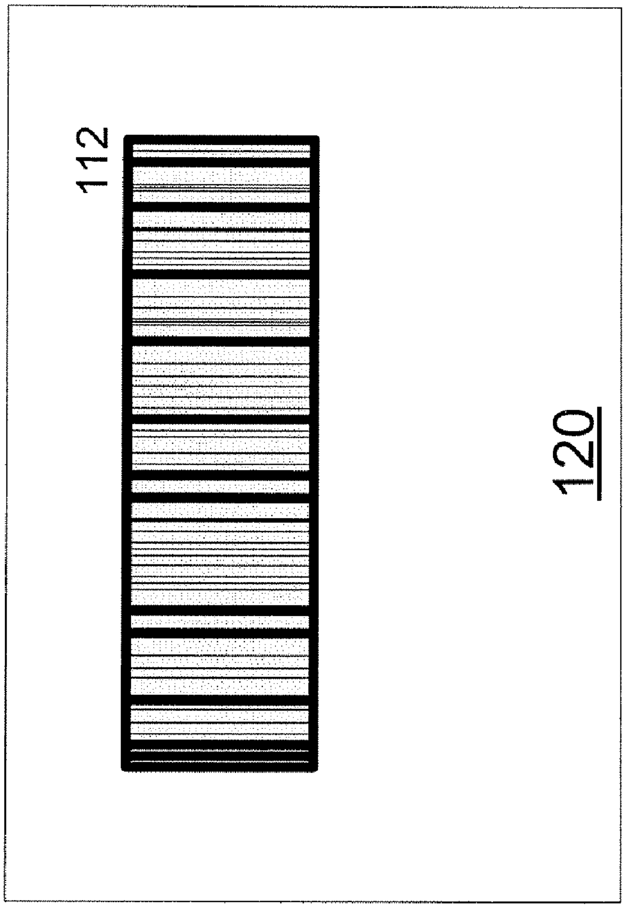
FIG. 3 is a representation of a barcode coupon that may be validated by the system of the present invention.

FIG. 3 depicts an exemplary embodiment of a barcode coupon 120 including a barcode 112. Barcode coupon 120 may be printed on white paper with a size similar to U.S. currency notes, however, any color and/or dimensional configuration is possible. A standard for the barcode coupon exists, drafted by the Gaming Standards Association (GSA) that defines the size of the barcode, the width and heights of bars and spaces, the type of code used to encode digits, and the leading and trailing "quiet zones" to allow the barcode to be registered and decoded properly.

System 40 depicted in FIG. 4 may have some advantages as compared to a standard bar code reader. For example, the dimensions of barcode coupon 120 may be such that a standard bar code reader either cannot read the entire barcode 112 in one field of view, or barcode coupon 120 is disposed on a portion of note channel 111 such that barcode 112 is out of range of the standard bar code reader (e.g., because its note channel is wider than barcode coupon 120 and/or barcode 112). In such a case, a plurality of standard bar code readers may be necessary. Since system 40 including linear array 105 may be configured and positioned to detect and/or read an entire width of note channel 111, only one linear array 105 may be necessary to read barcode 112 on barcode coupon 120, no matter how barcode 112 is positioned or where it is located in note channel 111.

There may be several advantages to using a system including a linear array instead of individual photodetectors or even an integrated set of individual photodetectors for note validation. For example, the use of a single linear array may minimize the optical components and external circuitry (e.g., separate phototransistors or photodiodes, op-amps, multiplexers, etc.) used in conventional validators. This may reduce the cost and may improve the reliability of the unit in general to support the operation of the unit.

Another advantage of using a system including a linear array may be the higher resolution data provided over the historically limited data obtained from individual photodetectors used in previous units. A system including a linear array may provide a high resolution pixel size of less than 1 mm×1 mm, permitting an accurate measurement of the length and width of the note-to-be-verified. This may permit a resolution of about 38 pixels per inch in both axes, when used with an 86 mm channel width, this being sufficient to cover the majority of the currency used in the world today. Use of a larger array (more pixels) or multiple arrays may allow this resolution to be increased, if desired.

A further advantage of a system with a linear array may be the ability to provide an image across the entire note, rather than the narrow strips which result from using individual photodetectors.

Yet another advantage of a system including a linear array may include a very fast determination of a note denomination. For any country that prints their note with multiple widths and lengths, the software system described herein may be able to line up an edge of an image of the note-to-be-verified with an edge of an image of a verified note stored in the database, and thus may quickly reduce the number of denominations in the database that must be compared with the note-to-be-verified to only one or two exemplars. After this initial step, a more precise test or tests can be made to accurately determine the single possible note that the note-to-be-verified could be. Once the denomination has been positively determined, the security process may be begun using the scanned note. This may include comparing data from the various wavelengths of the verified note stored in the database with corresponding data collected from the note-to-be-verified to verify its authenticity. A machine of this type may have application in the retail market for self-checkout in grocery, hardware, and other like applications where validator speed may be at a premium.

In another advantage, a system including a linear array may be compatible with previous systems. Since the data scanned using linear array 5 is relatively high resolution, the scanned data could be reduced/excised/adapted/compressed by CPU 12 such that the output is at a lower resolution or format that may match and/or be compatible with data present in existing validators. Thus, the data processed in this manner may provide the same information as a validator that scans the data at the lower resolution. As an example, the 128 by 260 pixel image of a 6" note scanned with this system, can be processed to a 12 by 120 image by averaging pixels in both X and Y directions, and storing the averaged image. In another example, a high resolution image can by converted to a low resolution image by taking an average of every 5 pixels on the array to create 25 'virtual' pixels, wherein each virtual pixel is an average of 5 pixels across the array. Similarly, the points could be averaged along the long portion of the note; or can be averaged in both X and Y axes. So rather than 128 stripes of varying info, 25 stripes of 5 pixels across are created.

This data reduction may reduce the software burden (i.e., less data to compare later), and may also reduce the time required to generate a high resolution database because a database from a previous generation product could be used to process the compressed data, avoiding the necessity of developing a new database for the new hardware. This may permit a system including a linear array to be shipped with an existing database of notes without spending time to collect new data and generate the database from scratch, reducing costs and lead time.

An embodiment of the invention may include a method of operating system 1. The methods and steps may be adjusted to suit the various embodiments set forth herein, for example, systems 51, 71, 40.

Note 2 may be inserted into note channel 11 of note transporter 10. Note transporter 10, which may be controlled by CPU 12, may advance note 2 through note channel 11 in the direction of the arrow set forth in FIG. 1. At some point, CPU 12 may send a signal COLOR to LED driver 14 to only illuminate LEDs 7. LEDs 7 have a different wavelength than LEDs 9.

When a first portion of note 2 passes over transmission window 8, CPU 12 may instruct note transporter 10 to stop the motion of note 2, and CPU 12 may send a digital signal to D/A converter 13 to turn on LEDs 7, 9. D/A converter 13 may convert the digital signal into an analog signal and may send that analog signal to LED driver 14. LED driver 14, taking into account the COLOR signal from CPU 12 and the analog signal from D/A converter 13 may instruct LEDs 7 to turn on and/or stay illuminated.

At that point, CPU 12 may set the STROBE function to high and send that signal to linear array 5. Linear array 5 may then turn "on" and begin to scan the portion of note 2 visible through transmission window 8. Linear array 5 may scan an entire width of note 2 and/or note channel 11 simultaneously, and the scanned analog data may have a "length" in the direction of travel of note 2 equal to or less than a pixel size of linear array 5, for example, about 0.67 mm. Linear array 5 scans note 2 by collecting light that leaves LEDs 7, goes through transmission window 8, reflects off note 2, goes back through transmission window 8, enters lens 3, and is focused onto linear array 5. Linear array 5 continues to scan note 2 via this procedure until the STROBE function is set to low by CPU 12 and sent to linear array 5. The time between the setting of the STROBE function to high and low determines the amount of time linear array 5 is exposed to light from LEDs 7 that is reflected off of note 2.

Once the CPU 12 sets the STROBE function to low and sends the signal to linear array 5, linear array 5 takes the analog data acquired in its scan and places it into a holding register that may be a part of linear array 5. CPU 12 also commands note transporter 10 to move note 2 further down note channel 11. Note 2 is moved any desired increment, for example, a formula which proceeds as follows:

Increment Moved<(Pixel Size/Number of Wavelengths)

In this case, the pixel size is about 0.67 mm and there are two wavelengths of LEDs 7, 9, thus the increment moved would be less than about 0.33 mm. CPU 12 also sends a signal COLOR to LED driver 14 to only illuminate LEDs 9. Once note 2 has moved the desired increment such that a different, albeit possibly overlapping, portion of note 2 is visible through transmission window 8, CPU 12 sends a digital signal to D/A converter 13 to turn LEDs 7, 9 on, which then converts that digital signal into an analog signal before sending the analog signal to LED driver 14. LED driver 14 processes the COLOR signal and the analog signal and turns only LEDs 9 on.

CPU 12 again sets the STROBE function on high and sends the signal to linear array 5. Linear array 5 thus again begins to scan note 2 from light that travels from LEDs 9, through transmission window 8, reflects from note 2, goes back through transmission window 8, enters lens 3, and is focused on linear array 5.

In the meantime, CPU 12 also sends a signal CLK to linear array 5. This causes linear array 5 to take the analog data in the holding register from the previous scan of note 2 done while LEDs illuminated and sends it to amplifier 18. Amplifier 18 amplifies the scanned analog data and sends it to A/D converter 11. A/D converter 15 converts the scanned analog data into digital data, and then sends that digital data to CPU 12 for storage and further processing. In certain instances, it may take multiple CLK signals sent from CPU 12 to linear array 5 to get all of the scanned data from one previous scan from linear array 5 to CPU 12.

When the exposure while note 2 is being illuminated by LEDs 9 is complete, CPU 12 will set the STROBE function on low and send that signal to linear array 5. Linear array 5 will thus again place this newly scanned analog data into the holding register. CPU 12 then again controls note transporter 11 to move note 2, and the entire scanning process is repeated by alternating illuminations of LEDs 7, 9 until an entirety of note 2 has been scanned.

At some point, CPU 12 may aggregate scanned data for note 2 into planes. Where two sets of LEDs 7, 9 having different wavelengths were used to scan note 2, a separate plane may be created for each different wavelength. Once a plane has been created for each wavelength, the different planes may be joined to create a multi-spectral plane. CPU 12 may manipulate any of the individual planes and/or aggregate plane in any suitable manner.

For example, CPU 12 may determine the edges of note 2 in the plane(s). CPU 12 may then take those edges and match them up with edges of images of notes stored in a database. Thus, the images of note 2 and the notes stored in the database should correspond. CPU 12 may also manipulate the image of note 2 in any manner, for example, rotate it across all three axes so as to align it with the orientation of the notes stored in the database.

CPU 12 may then perform any suitable analysis. For example, CPU 12 may determine the origin and/or denomination of note 2 by comparing its dimensions and/or features to dimensions and/or features of those notes stored in the database. CPU 12 may determine the authenticity of note 2 by comparing any combination of features from the images of note 2 with the features from images of a note stored in the database.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A validation device comprising:
- a channel for accommodating a note;
- a photodetector array for scanning an entire width of the note, the photodetector array being an integrated circuit array;
- a transporter for transporting the note through the channel;
- at least one independent illuminator for illuminating an entire width of the channel, the at least one independent illuminator positioned independently from the photodetector array; and
- a single lens associated with the photodetector array, the single lens for focusing the entire width of the channel on the photodetector array,
- wherein a combination of the single lens and the at least one independent illuminator provides optical data collected from the entire width of the channel to the photodetector array.

2. The apparatus of claim 1, wherein the photodetector array is arranged substantially perpendicular to a direction of travel of the note through the channel.

3. The apparatus of claim 1, wherein the at least one independent illuminator is an LED.

4. The apparatus of claim 1, wherein a wavelength of the at least one independent illuminator is in the ultraviolet spectrum.

5. The apparatus of claim 1, wherein a wavelength of the at least one independent illuminator is in the infrared, visible, or blue spectrum.

6. The apparatus of claim 1, wherein a combination of the single lens and the photodetector array obtains the optical data by receiving light emitted from the at least one independent illuminator and reflected from the note.

7. The apparatus of claim 1, wherein a combination of the single lens and the photodetector array obtains the optical data by receiving light emitted from the at least one independent illuminator and transmitted through the note.

8. The apparatus of claim 1, wherein the at least one independent illuminator emits light having more than one wavelength.

9. The apparatus of claim 1, wherein the at least one independent illuminator emits light onto the note in a direction that is substantially perpendicular to the direction of travel of the note through the channel.

10. The apparatus of claim 1,
- wherein the note is a barcode coupon,
- wherein the at least one independent illuminator projects a line of light onto the barcode coupon,
  - with the line of light having a width substantially equal to or less than a thickness of the widest bar on the barcode coupon, and
  - with the line of light positioned in the direction of travel of the barcode coupon through the channel on the transporter; and
- wherein a combination of the single lens and the photodetector array receives light reflected from or transmitted through the barcode coupon.

11. The apparatus of claim 1, further comprising a central processing unit for receiving the optical data from the photodetector array.

12. The apparatus of claim 11, wherein the central processing unit averages the optical data across the photodetector array so as to reduce a resolution of the optical data.

13. The apparatus of claim 11, wherein the central processing unit averages the optical data along the direction of travel of the note through the channel so as to reduce a resolution of the optical data.

14. The apparatus of claim 11, wherein the central processing unit centers an image of the note in the channel.

15. The apparatus of claim 1, wherein the apparatus is a currency validator and the note is a currency note.

16. An apparatus, comprising:
- a channel for accommodating a note;
- a transporter for transporting the note through the channel;
- a first photodetector array, the first photodetector array being an integrated circuit array and being disposed on a first side of the channel to scan an entire width of the note;
- a first single lens associated with the first photodetector array, the first single lens for focusing the entire width of the channel on the first photodetector array;
- a second photodetector array, the second photodetector array being an integrated circuit array and being disposed on a second side of the channel to scan an entire width of the note;
- a second single lens associated with the second photodetector array, the second single lens for focusing the entire width of the channel on the second photodetector array; and
- at least one independent illuminator for illuminating an entire width of the channel, the at least one independent illuminator positioned independently from the photodetector array,
- wherein the first lens provides first optical data to the first photodetector array collected from the entire width of the channel illuminated by the at least one independent illuminator,
- wherein the second lens provides second optical data to the second photodetector array collected from the entire width of the channel illuminated by the at least one independent illuminator.

17. The apparatus of claim 16, where the first and second photodetector arrays are arranged substantially perpendicular to a direction of travel of the note through the channel.

18. The apparatus of claim 16, where the first and second photodetector arrays are disposed on substantially opposite sides of the channel.

19. The apparatus of claim 16, wherein the at least one independent illuminator is an LED.

20. The apparatus of claim 16, wherein a wavelength of the at least one independent illuminator is in the ultraviolet spectrum.

21. The apparatus of claim 16, wherein a wavelength of the at least one independent illuminator is in the infrared, visible, or blue spectrum.

22. The apparatus of claim 16, wherein a combination of the first lens and the first photodetector array obtains the first optical data by receiving light emitted from the at least one independent illuminator and reflected from the note.

23. The apparatus of claim 16, wherein a combination of the second lens and the second photodetector array obtains the second optical data by receiving light emitted from the at least one independent illuminator and transmitted through the note.

24. The apparatus of claim 16, wherein the at least one independent illuminator emits light having more than one wavelength.

25. The apparatus of claim 16, wherein the at least one independent illuminator emits light onto the note in a direction that is substantially perpendicular to the direction of travel of the note through the channel.

26. The apparatus of claim 16, wherein the note is a barcode coupon, wherein the at least one independent illuminator projects a line of light on the barcode coupon, with the line of light having a width substantially equal to or less than a thickness of the widest bar on the barcode coupon, and with the line of light positioned in the direction of travel of the barcode coupon through the channel on the transporter; and wherein at least one of a combination of the first lens and the first photodetector array and a combination of the second lens and the second photodetector array receives light reflected from or transmitted through the barcode coupon.

27. The apparatus of claim 16, further comprising a central processing unit for receiving at least one of the first and second optical data.

28. The apparatus of claim 27, wherein the central processing unit averages the at least one of the first and second optical data across at least one of the first and second photodetector arrays so as to reduce a resolution of the at least one of the first and second optical data.

29. The apparatus of claim 27, wherein the central processing unit averages the at least one of the first and second optical data along the direction of travel of the note through the channel so as to reduce a resolution of the at least one of the first and second optical data.

30. The apparatus of claim 28, wherein the central processing unit further averages the at least one of the first and second optical data along the direction of travel of the note through the channel so as to further reduce the resolution of the at least one of the first and second optical data.

31. The apparatus of claim 27, wherein the central processing unit centers an image of the note associated with the first and second optical data.

32. The apparatus of claim 16, wherein the apparatus is a currency validator and the note is a currency note.

33. An apparatus, comprising:

a channel for accommodating a note;

a transporter for transporting the note through the channel;

a photodetector array for scanning an entire width of the note, the photodetector array being an integrated circuit array;

a single lens associated with the photodetector array, the single lens for focusing an entire width of the channel on the photodetector array;

at least one first independent illuminator comprising an illuminator that is positioned independently from the photodetector array and illuminates the note in the channel, the at least one first independent illuminator being disposed on a same side of the channel as the photodetector array; and at least one second independent illuminator comprising an illuminator that is positioned independently from the photodetector array and illuminates the note in the channel, wherein the at least one second independent illuminator illuminates light traveling from the at least one second independent illuminator, through the note, through the lens, and to the photodetector array.

34. The apparatus of claim 33, wherein the at least one second independent illuminator is disposed on a side of the channel opposite the photodetector array.

35. The apparatus of claim 33, wherein the single lens and the photodetector array receive reflected light from the at least one first independent illuminator and transmissive light from the at least one second independent illuminator.

36. The apparatus of claim 33, wherein the photodetector array is arranged substantially perpendicular to a direction of travel of the note through the channel.

37. The apparatus of claim 33, wherein at least one of the at least one first independent illuminator and the at least one second independent illuminator is an LED.

38. The apparatus of claim 33, wherein a wavelength of at least one of the at least one first independent illuminator and the at least one second independent illuminator is in the ultraviolet spectrum.

39. The apparatus of claim 33, wherein a wavelength of at least one of the at least one first independent illuminator and the at least one second independent illuminator is in the infrared, visible, or blue spectrum.

40. The apparatus of claim 33, wherein the at least one first independent illuminator emits light having a first wavelength and the at least one second independent illuminator emits light having a second wavelength different from the first wavelength.

41. The apparatus of claim 33, wherein at least one of the at least one first independent illuminator and the at least one second independent illuminator emits light having more than one wavelength.

42. The apparatus of claim 33, wherein at least one of the at least one first independent illuminator and the at least one second independent illuminator emit light to the note in a direction that is substantially perpendicular to the direction of travel of the note through the channel.

43. The apparatus of claim 33, wherein the note is a barcode coupon, wherein at least one of the at least one first independent illuminator and the at least one second independent illuminator projects a line of light on the barcode coupon, with the line of light having a width substantially equal to or less than a thickness of the widest bar on the barcode coupon, and with the line of light positioned in the direction of travel of the barcode coupon through the channel on the transporter; and wherein a combination of the single lens and the photodetector array obtains optical data by receiving light reflected from or transmitted through the barcode coupon.

44. The apparatus of claim 33, wherein a combination of the single lens and at least one of the at least one first independent illuminator and the at least one second independent illuminator provide optical data collected from the width of the channel to the photodetector array.

45. The apparatus of claim 44, further comprising a central processing unit for receiving the optical data from the photodetector array.

46. The apparatus of claim 45, wherein the central processing unit averages the optical data across the photodetector array so as to reduce a resolution of the optical data.

47. The apparatus of claim 45, wherein the central processing unit averages the optical data of the note along the direction of travel through the channel so as to reduce a resolution of the optical data.

48. The apparatus of claim 45, wherein the central processing unit centers an image of the note in the channel.

49. The apparatus of claim 33, wherein the apparatus is a currency validator and the note is a currency note.

* * * * *